(12) United States Patent
Laurent et al.

(10) Patent No.: US 7,756,610 B2
(45) Date of Patent: Jul. 13, 2010

(54) SOLENOID CONTROLLER

(75) Inventors: Christophe A. Laurent, Lake Orion, MI (US); Mark R. Buchanan, Rochester Hills, MI (US); Melissa M. Koenig, Howell, MI (US)

(73) Assignee: BorgWarner, Inc., Auburn Hills, MI (US)

( * ) Notice: Subject to any disclaimer, the term of this patent is extended or adjusted under 35 U.S.C. 154(b) by 523 days.

(21) Appl. No.: 11/634,699

(22) Filed: Dec. 6, 2006

(65) Prior Publication Data

US 2007/0133143 A1 Jun. 14, 2007

Related U.S. Application Data

(60) Provisional application No. 60/748,481, filed on Dec. 8, 2005.

(51) Int. Cl.
G05D 1/02 (2006.01)
G06F 17/00 (2006.01)

(52) U.S. Cl. .............................. 700/302; 700/9; 700/20; 701/51; 701/58; 361/160; 361/236

(58) Field of Classification Search ...................... 700/9, 700/19, 20, 21, 45, 63, 302, 304; 477/140–149, 477/130–139, 120–129; 361/160, 170, 236; 701/51, 58
See application file for complete search history.

(56) References Cited

U.S. PATENT DOCUMENTS 5,460,582 A * 10/1995 Palansky et al. ............ 477/138
5,513,104 A * 4/1996 Tsutsui et al. ................ 701/60
5,749,060 A * 5/1998 Graf et al. .................. 340/439
6,164,160 A 12/2000 Nassar
6,339,740 B1 * 1/2002 Seto et al. ..................... 701/96
6,530,856 B1 * 3/2003 Kakiage ..................... 475/123
2001/0006924 A1 7/2001 Kuehn et al.
2002/0088304 A1 * 7/2002 Thorum et al. ............. 74/600 R

FOREIGN PATENT DOCUMENTS

| DE | 43 34 595 C1 | 4/1995 |
|---|---|---|
| DE | 101 30 833 A1 | 1/2002 |
| DE | 10130833 A1 | 1/2002 |
| EP | 1 462 681 A2 | 9/2004 |

* cited by examiner

Primary Examiner—Paul L Rodriguez
Assistant Examiner—Sheela Rao
(74) Attorney, Agent, or Firm—Warn Partners, P.C.

(57) ABSTRACT

An autonomous solenoid controller which in its broad aspect includes a microprocessor, a communication bus, and a solenoid driver. The microprocessor includes logic in order to control drivers for at least one solenoid. The communications bus is operably connected to the microprocessor so that the communications bus and the microprocessor communicate with one another. The communication bus communicates with an outside transmission control unit. The solenoid driver is electrically connected between the microprocessor and the solenoid, such that the microprocessor commands the solenoid driver to alter the position of the solenoid.

17 Claims, 2 Drawing Sheets

SOLENOID CONTROLLER

CROSS-REFERENCE TO RELATED APPLICATIONS

This application is a continuation of U.S. Patent Application No. 60/748,481 filed on Dec. 8, 2005. The disclosure of the above application is incorporated herein by reference.

FIELD OF THE INVENTION

The present invention relates to a solenoid controller for a transmission.

BACKGROUND OF THE INVENTION

Lead frames are used to reduce the installation time of certain components such as solenoids that are used in automotive transmissions. The lead frame consists of a series of metal connections that are overmolded with an insulative type material. Thus, components can be inserted into a valve body lead frame at predetermined locations so that the prefabricated metal connections will connect the desired components. However, in past units, controllers of these components are indirectly connected to the lead frame. In other words, the controllers are usually provided externally to the lead frame and are therefore not attached at one of the prefabricated locations on the lead frame which makes a direct connection to the prefabricated connectors. For example, a solenoid driver which is used to activate a solenoid would be external and indirectly connected to the lead frame in which the solenoid is attached to. Thus, typically the solenoid drivers are connected to the lead frame by external electrical wires. Since, the drivers are typically part of the externally connected transmission control unit they are made by a different company than the companies making the solenoids on the lead frame. There are inefficiencies in the design, calibration, and coordination of these components.

Furthermore, a central processing unit for controlling the driver logic is also indirectly connected through the transmission control unit to the lead frame. These indirect connects can be problematic because the components that are indirectly connected to the lead frame may not function in the same protocol as the components that are directly connected to the lead frame.

Therefore, it is desirable to design a solenoid controller which eliminates these problems. In addition, the design reduces the amount of electrical wiring and connections, and the components would be more compatible.

SUMMARY OF THE INVENTION

Provided for in the present invention is an autonomous solenoid controller which includes a microprocessor, a communication bus, and a solenoid driver. The microprocessor includes logic in order to control at least one solenoid. The communications bus is operably connected to the microprocessor so that the communications bus is used by the microprocessor to communicate with other electronic units. Also, the communication bus communicates with an outside transmission control unit. In addition, the solenoid driver is electrically connected between the microprocessor and the solenoid, such that the microprocessor commands the solenoid driver to alter the position of the solenoid.

The invention also includes, as another embodiment, a solenoid controller that is integrated with a connection interface which has at least one solenoid driver. The solenoid controller has a microprocessor that determines a solenoid's operating condition based upon data collected from a sensor and then uses pre-programmed logic to determine the proper solenoid position. Then through the communication bus the solenoid controller controls the solenoid drivers associated with the solenoids in response to a transmission control unit's demand. Also, the solenoid controller can command the solenoid driver to alter the position of the solenoid through the communication bus. The connection interface can be a valve body lead frame, flex connect wire, or standard electric wiring connections.

The communication bus can also be used to receive signals from sensors that are both connected to the valve body lead frame and sensors that are not directly connected to the valve body lead frame. The sensors that are communicating via the communication bus can be used to determine a variety of physical properties of the components in which the sensors are monitoring and through the microprocessor reconfigures the solenoids to provide proper control. Also, the solenoid driver is used to direct an electrical current to the solenoid in order to alter the conditions of the solenoid.

Further areas of applicability of the present invention will become apparent from the detailed description provided hereinafter. It should be understood that the detailed description and specific examples, while indicating the preferred embodiment of the invention, are intended for purposes of illustration only and are not intended to limit the scope of the invention.

BRIEF DESCRIPTION OF THE DRAWINGS

The present invention will become more fully understood from the detailed description and the accompanying drawings, wherein.

DETAILED DESCRIPTION OF THE PREFERRED EMBODIMENTS

Figure 1:
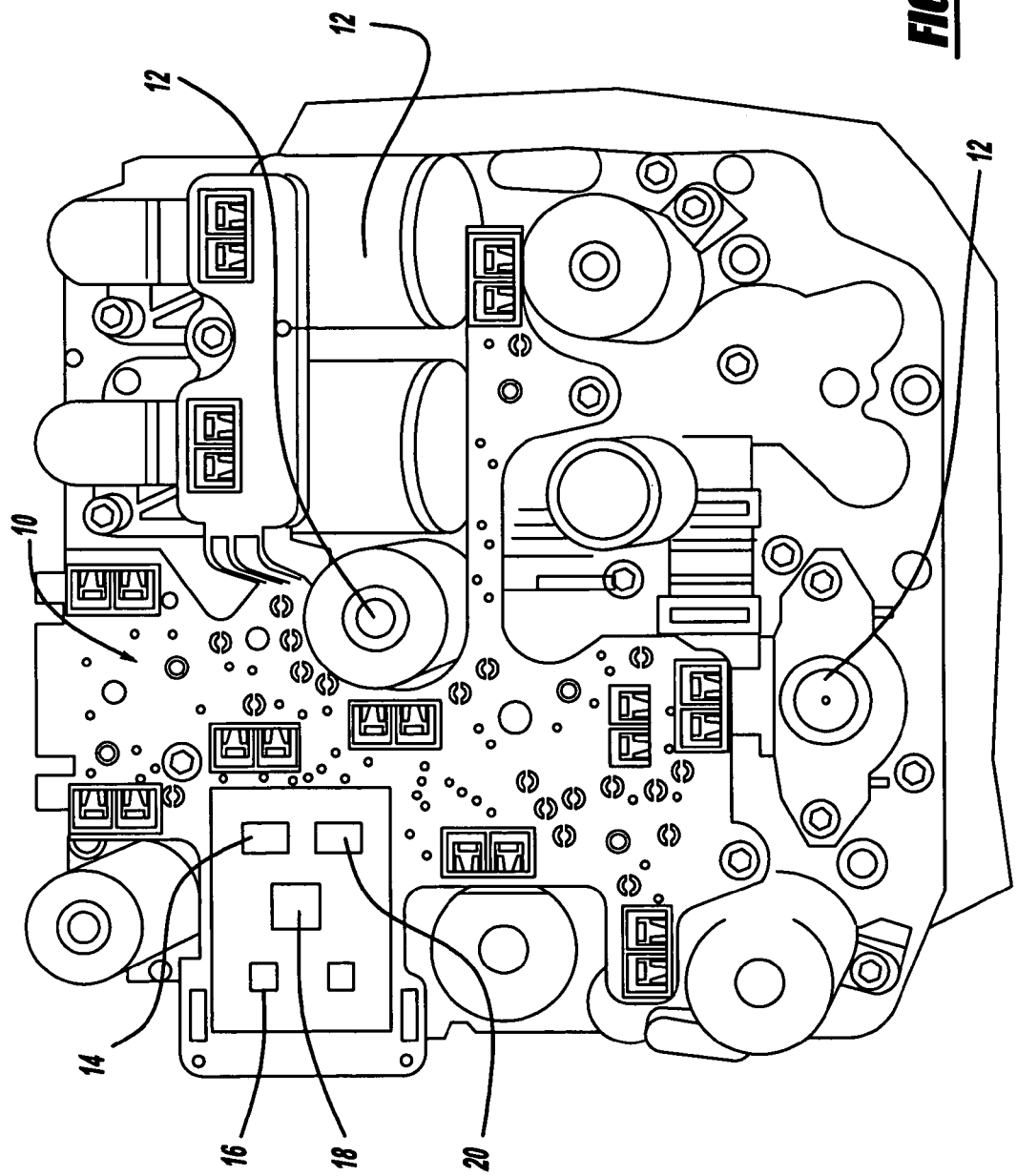
FIG. 1 is a perspective view of the controller on a transmission.
Figure 2:
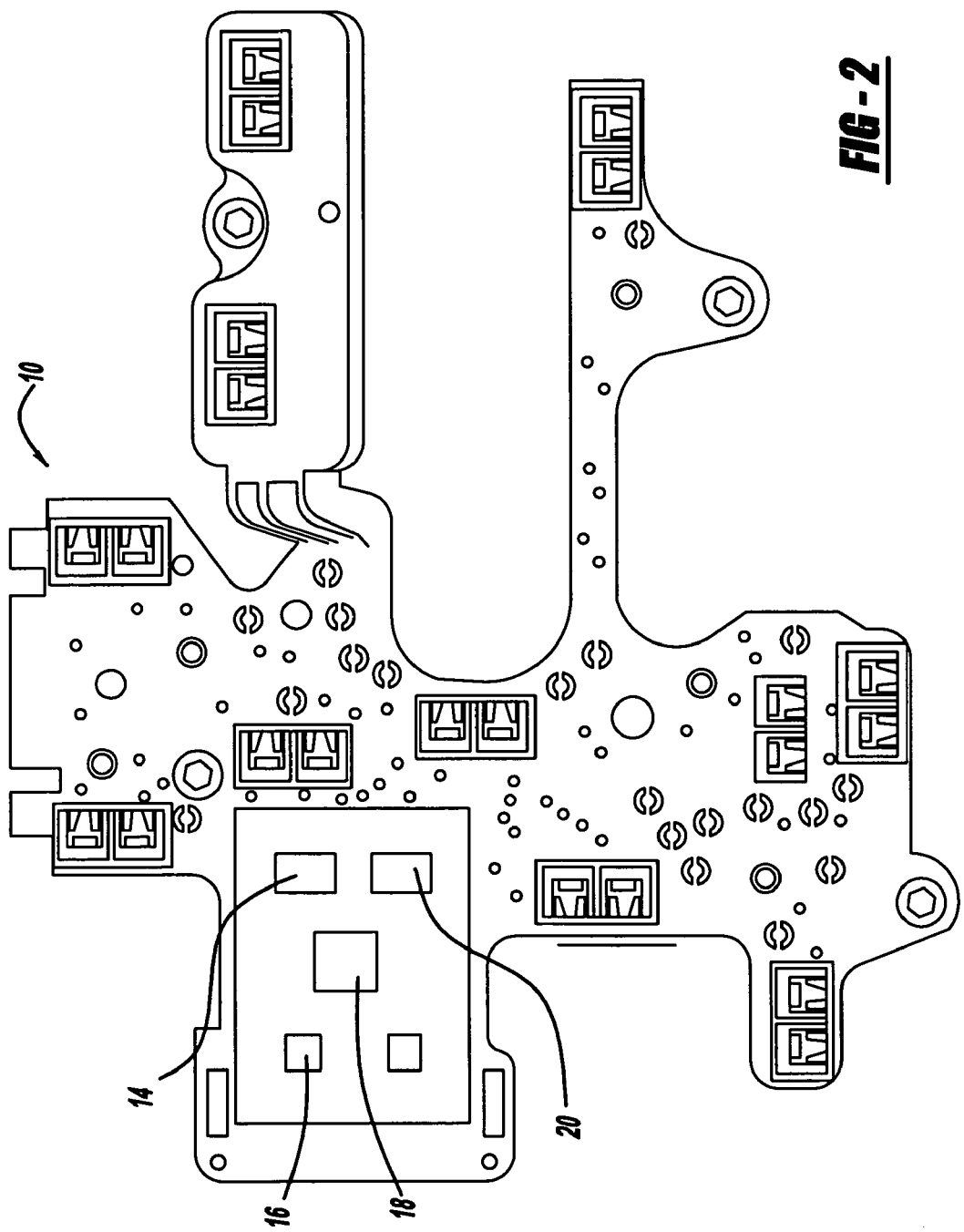
FIG. 2 is a plan view of the lead frame.

The following description of the preferred embodiment(s) is merely exemplary in nature and is in no way intended to limit the invention, its application, or uses.

The present invention relates to a solenoid 12, a solenoid driver 14, a communication device 16, and a solenoid controller 18 that are all directly or ultimately electrically connected to one another. The solenoid controller 18 includes a microprocessor and a communication device, such as a communication bus using a controller area network (CAN) protocol, and the solenoid driver 14. The solenoid controller 18 can be a high level controller that determines the running parameters of the vehicle or a low level controller where the solenoid controller 18 receives commands from an engine control unit (ECU) or a transmission control unit (TCU). The above components are operably connected by a connection interface which can be, but not limited to, standard electrical wiring connectors, flex connect wire, or a lead frame where all or a portion of the above components are directly connected to the lead frame. No matter how the above components are connected to one another, the solenoid controller 18 obtains data from at least one sensor 20 about the running parameters of either the transmission, the solenoid 12, or both. The solenoid controller 18 receives the signals from the sensors 20 through the communication device 16. Then the solenoid controller 18 analyzes the data from the sensors 20 through the microprocessor having preprogrammed logic to determine if the position of the solenoid 12 needs to be altered. The solenoid controller 18 then commands the solenoid driver 14 to alter the position of the solenoid 12.

Referring to FIG. 1, a solenoid controller 18 is integrated with a valve body lead frame generally shown at 10. In this embodiment, lead frame 10 is provided because of the ease of connecting components to one another on a lead frame in the manufacturing process. Typically, the solenoid controller 18 of the present invention is integrated with the lead frame 10. However, the below description is applicable to the present invention without regard to how individual components are electrically connected to the solenoid controller 18.

At least one solenoid 12 is connected to the lead frame 10. A plurality of solenoids 12 are connected to the lead frame 10. Likewise, the solenoid controller 18 controls the solenoid driver 14 that is connected to the lead frame 10, so that the solenoid driver 14 can transmit signals that alter the condition of the solenoid 12. Typically, a plurality of solenoid drivers 14 corresponding to the solenoids 12 provided are connected to the lead frame 10, but it is typical that the number of solenoid drivers 14 is the same as the number of solenoids 12. The communication device 16 is also directly connected to the lead frame 10 as a part of the solenoid controller 18. The communication device 16 transmits and receives signals from the solenoid driver 14 and sensors 20. Thus, the communication device 16 is receiving and transmitting signals dealing with the current state and desired output or setting of the solenoid 12 for achieving the desired control input to the transmission.

The communication device 16 uses the CAN protocol. Using the CAN protocol is preferred because the CAN protocol is the default protocol for powertrain components, and therefore the communication device 16 will be able to transmit and receive signals from many other components, such as the ECU (not shown), TCU (not shown), or other components such as various operational devices or sensors. Thus, the communication network in the solenoid controller 18 is standardized to the engine drive train. However, any type of protocol can be used so long as it is compatible with the vehicle's system, such as but not limited to, pulse width modulation (PWM), flex ray, and time-triggered CAN protocol. Therefore, the ECU or TCU can transmit and receive signals about engine conditions, and communicate with the communication device 16 and the microprocessor of the solenoid controller 18 so that the solenoid driver 14 will function in a particular manner. In addition, the communication device 16 has a CAN driver (not shown) that has a high and low input/output that is connected to the components that are not connected to the valve body lead frame 10. Thus, the communication device 16 can transmit and receive signals with other components, even though the other components are external to the valve body lead frame 10.

Since the ECU can communicate directly with the communication device 16, the transmission is either controlled in the ECU or other processing system in the vehicle or a separate TCU can be provided if desired. Thus, a conventional complete internal TCU is not required in order to control the solenoid driver 14 and ultimately the solenoid 12. If a TCU remains part of the system, the TCU will have a limited function compared to its function in prior art systems. Thus, the TCU does not compute or analyze the operating parameters of the solenoid 12. Instead, the TCU collects the transmission's operating parameters and transmits the desired solenoid data to the communication device 16 so that a separate component can analyze the solenoid's 12 parameters and determine if the solenoid's 12 position needs to be altered. Thus allowing the TCU to only require processing capabilities for high level control inputs. The solenoid controller 18 provides the needed processing for actual calibration and control of the solenoid 12.

The lead frame 10 consists of prefabricated metal connections which are overmolded with an insulative type material. The solenoid controller 18 is placed on the valve body lead frame 10, such that it is connected to the solenoids on the lead frame 10 by one of the prefabricated metal connections. A connector is provided for connection between the communication bus and the external TCU or ECU.

Furthermore, the solenoid controller 18 is connected to the valve body lead frame 10. The solenoid controller 18 is an electronic control module that communicates with the communication device 16 and ultimately other components of the valve body lead frame 10. The solenoid controller 18 includes a microprocessor or a central processing unit (CPU) and the communication device 16. The solenoid controller 18 has the ability to analyze the signals received by the communication device 16 in order to determine the required driver input for operation of solenoid 12 in response to an input parameter of the TCU. The solenoid controller 18 commands the solenoid driver 14 in order for the solenoid 12 control condition to be altered. With the control logic on board in the microprocessor, the drivers and solenoids can be matched and electrically calibrated in a single location, which creates a lower tolerance than a solenoid that is mechanically calibrated. In addition, the solenoid controller 18 can be used for a variety of other functions which it can be programmed to do. For example, the solenoid controller 18 can receive and transmit signals of integrated sensors or the like with other control units such as the ECU.

In an alternate embodiment, the valve body lead frame 10 also contains a sensor 20 which is used to monitor control parameters of components that are directly connected to the valve body lead frame 10. The sensor 20 is connected to the communication device 16 so that signals can be received and the solenoid controller 18 can analyze the state through programmed logic and determine the needed repositioning of the solenoid 12. Thus, the sensor 20 collects data about the operating conditions which relate to the control of the solenoid 12 and ultimately transmits the data to the solenoid controller 18 through the communication device 16. Any number of sensors 20 can be connected to the valve body lead frame 10 to determine the condition of any number of components. For example, the sensor 20 can be used to determine, by way of example but not limitation, the temperature, position, speed, revolutions per minute, or pressure condition of one of the valve body lead frame's 10 components.

The solenoid controller 18 also reports diagnostics through the communication device 16 to the external TCU. Thus, the sensor 20 transmits the collected data through the communication device 16 to the solenoid controller 18. The solenoid controller 18 then receives the data and through programmed logic the solenoid controller 18 analyzes the data from the sensor 20 to determine if the solenoid 12 is functioning properly. Either the external TCU or the solenoid controller then commands a correction. Thereafter, the solenoid controller 18 commands the solenoid driver 14 to alter the conditions of the solenoid 12. The solenoid controller 18 has an EPROM, EEPROM, flash, or some means of memory in order to store the predetermined operational parameters of the solenoid 12 in order to compare current commands with known or calculated solenoid 12 positions and required adjustments, and thus determine any driver control commands based upon predetermined parameters. The memory used to store the operational parameter can be outside of the solenoid controller 18 and electronically connected to the solenoid controller 18 in any of the various ways. Also, the solenoid controller 18 can be reflashed or reprogrammed, such that the solenoid controller 18 will utilize changed or updated solenoid 12 positions or adjustments. The reflashing of the solenoid controller 18 also allows the preprogrammed logic of the solenoid controller 18 to be altered so that the solenoid controller 18 can command the solenoid 12 as required if operational parameters change. In this way, operational parameters and calibration data can be stored or reprogrammed as necessary.

In an alternate embodiment, the communication device 16 receives signals from sensors that are not directly connected to the valve body lead frame 10. In other words, these sensors are not placed into one of the valve body lead frame's 10 connection points and are connected to the valve body lead frame 10 by other means. For example, these sensors can be electronically connected to the communication device 16 by additional wires or any of the other means of electrical connection described above which are capable of transmitting the signals from the sensor to the communication device 16. Sensor input may also be communicated by way of the ECU or TCU. Thus, the solenoid controller 18 receives data from such external sensors through the communication device 16. These sensors that are not directly connected to the valve body lead frame 10 are capable of determining any type of parameter similar to those described for the sensor 20 that is directly connected to the valve body lead frame 10. However, this embodiment requires additional connections and electrical wiring, which is not required for the sensors 20 that are directly connected to the valve body lead frame 10.

As stated above, the valve body lead frame 10 has a solenoid driver 14. The solenoid driver 14 meters an electrical current to the solenoid 12 in order to alter the conditions of the solenoid 12. For example, the solenoid driver 14 can activate the solenoid 12 by sending an electrical current to the solenoid 12 which electrically magnetizes the coils (not shown) of the solenoid 12 which in turn opens the solenoid 12 valve (not shown). Likewise, the solenoid driver 14 can close the solenoid's 12 valve by reducing or eliminating electrical current to the solenoid 12, which results in the solenoid's 12 coil being demagnetized and in turn the solenoid's 12 valve closes. The solenoid driver 14 can have a variety of methods for directing the electrical currents to the solenoid 12. For example, a solenoid driver 14 could have a constant electrical current that is turned on or off in accordance with the desired solenoid 12 condition. Another example, is to use a pulse width modulation electrical current in the solenoid driver 14, such that the pulse width modulations can be set at a predetermined frequency so that the solenoid 12 will be activated and deactivated at the desired time periods.

In operation, the communication device 16 is used to communicate between a TCU and the solenoid controller 18. The solenoid controller 18 receives and transmits signals of the state of and desired position of each solenoid 12 through the communication device 16. The solenoid controller 18 then reports the commanded status and any diagnostic troubles back to the TCU through the communication device 16. The solenoid controller 18 performs sensor processing and is used to control the solenoid 12 positioning. Having the solenoid 12, the solenoid driver 14 and the communication device 16 as part of the solenoid controller 18 allows the manufacturer to maintain control over the logic of the system, and allows the system to respond more reliably and efficiently to the ECU commands. For example, the manufacturer can alter the control logic of the system to provide for better fuel economy. Furthermore, because the above components are directly connected, the components allow the OEM manufacturer to control at a higher level the actual pressure rather than electrical current leaving the actual calibration setting or driving of the solenoid 12 to the solenoid control logics of the solenoid controller 18.

The description of the invention is merely exemplary in nature and, thus, variations that do not depart from the gist of the invention are intended to be within the scope of the invention. Such variations are not to be regarded as a departure from the spirit and scope of the invention.

What is claimed is:

1. An autonomous solenoid controller, adapted for operating at least one solenoid for controlling transmission functions, said solenoid controller comprising:
    a low level controller for controlling at least one solenoid in response to directions from an outside high level controller that determines the running parameters of a vehicle and sends signals to said low level controller;
    a communication bus that is operably attached to said low level controller for providing communication with said high level controller;
    at least one solenoid driver that is electrically connected between said low level controller and said at least one solenoid for selectively activating said at least one solenoid, wherein said low level controller activates said at least one solenoid driver in response to signals from said high level controller; and
    a connection interface wherein said at least one solenoid, said low level controller, at least one solenoid driver, said communication bus and said at least one solenoid are removably connected to said connection interface.

2. The autonomous solenoid controller of claim 1, wherein said communication bus uses a protocol selected from the group of at least one of a controller area network (CAN) protocol, pulse width modulation, flex ray, a time-triggered CAN protocol, or a combination thereof.

3. The autonomous solenoid controller of claim 1, wherein said low level controller performs diagnostics as to the operating conditions of said solenoid.

4. The autonomous solenoid controller of claim 3, wherein said low level controller is programmed to use stored data when performing diagnostics on said at least one solenoid.

5. The autonomous solenoid controller of claim 1, wherein said communication bus receives and transmits signals from at least one sensor.

6. The autonomous solenoid controller of claim 1, wherein said solenoid driver and said solenoid are pre-calibrated with parameters of the calibration stored in the low level controller.

7. The autonomous solenoid controller of claim 1, wherein said connection interface is selected from a group of a lead frame, a flex connect wire, a standard hard wire connections, or a combination thereof.

8. The autonomous solenoid controller of claim 1 wherein:
    said low level controller commands said at least one solenoid driver in response to a desired condition received through said communication bus from said high level controller.

9. The autonomous solenoid controller of claim 8, wherein said connection interface is selected from the group of a lead frame, a flex wire connect, a standard electric wiring connection, or combination thereof.

10. The autonomous solenoid controller of claim 8, wherein said communications bus uses a protocol selected from a group of at least one of a controller area network (CAN) protocol, a pulse width modulation, a flex ray, a time-triggered CAN protocol, or combination thereof.

11. The autonomous solenoid controller of claim 8, wherein at least one solenoid is operably connected to said connection interface, and said solenoid controller performs diagnostics as to the operating conditions of said solenoid.

12. The autonomous solenoid controller of claim 11, wherein said at least one solenoid driver and said at least one solenoid are pre-calibrated with parameters of the calibration stored in said low level controller.

13. The autonomous solenoid controller of claim 12, wherein said at least one solenoid driver has memory that is used in performing diagnostics where said memory is at least one of an EPROM, EEPROM, and flash.

14. The autonomous solenoid controller of claim 1, where said low level controller receives signals from at least one sensor and transmits a signal to the high level controller through the communication bus and said sensor is capable of determining at least one of a temperature, position, speed, revolutions per minute, and pressure condition.

15. The autonomous solenoid controller of claim 1, wherein said communication bus transmits and receives signals from devices that are located outside of said connection interface.

16. The autonomous solenoid controller of claim 1, wherein said at least one solenoid controller performs diagnostics as to the operating conditions of said solenoid, and said solenoid controller has memory that is used when performing diagnostics where said memory is at least one of an EPROM, EEPROM, and flash.

17. The autonomous solenoid controller of claim 1, wherein said at least one solenoid driver and said solenoid are pre-calibrated with parameters of the calibration stored in the low level controller.

* * * * *